United States Patent [19]
Ahlschwede et al.

[11] Patent Number: 4,463,628
[45] Date of Patent: Aug. 7, 1984

[54] TRANSMISSION CONTROL INTERFACE MECHANISM

[75] Inventors: Brian A. Ahlschwede; Kevin D. McKee, both of Waterloo, Iowa

[73] Assignee: Deere & Company, Moline, Ill.

[21] Appl. No.: 364,288

[22] Filed: Apr. 1, 1982

[51] Int. Cl.³ ............... B60K 41/08; B60K 41/22; F16D 43/22; F16D 23/00
[52] U.S. Cl. .................................. 74/861; 74/625; 192/0.033; 192/0.076; 192/0.096; 192/3.57
[58] Field of Search ............... 74/625, 626, 843, 856, 74/861, 866, 878, 752 A, 752 B, 752 C, 752 D, 479; 192/0.02 R, 0.03, 0.052, 0.032, 0.033, 0.076, 0.096, 3.57, 103 R

[56] References Cited

U.S. PATENT DOCUMENTS

| | | | |
|---|---|---|---|
| 2,660,072 | 11/1953 | Veenschoten | 74/625 |
| 3,548,987 | 12/1970 | Erikson | 74/336 X |
| 3,732,753 | 5/1973 | Olsen et al. | 74/752 A X |
| 3,805,640 | 4/1974 | Schneider et al. | 74/645 |
| 3,958,466 | 5/1976 | Espenschied | 74/867 |
| 4,015,488 | 4/1977 | Akeson et al. | 74/866 |
| 4,082,013 | 4/1978 | Dornfeld et al. | 74/866 |
| 4,208,925 | 6/1980 | Miller et al. | 74/866 |
| 4,208,929 | 6/1980 | Heino et al. | 74/731 |
| 4,246,990 | 1/1981 | Strantz | 74/752 C X |
| 4,282,780 | 8/1981 | Totani et al. | 74/861 X |
| 4,308,892 | 1/1982 | Van Ausdal | 137/625.23 |

FOREIGN PATENT DOCUMENTS

| | | | |
|---|---|---|---|
| 929524 | 6/1955 | Fed. Rep. of Germany | 74/625 |
| 2060445 | 5/1981 | United Kingdom | 74/89.15 |

Primary Examiner—Lawrence J. Staab
Assistant Examiner—Bruce F. Wojciechowski

[57] ABSTRACT

A vehicle includes a hydraulically operated multi-speed transmission controlled by a rotary pilot valve and pilot-operated shift valves. An electronic control unit generates electrical control signals for automatically controlling the transmission. A manually movable lever generates mechanical transmission control signals. An interface mechanism includes a sector gear which rotates the rotary valve in response to movement of the lever. A stepping motor rotates the sector gear via a torque-multiplying gear train in response to the electrical control signals. A rotary gear ratio encoder is rotatably cooupled to the rotary pilot valve and generates signals indicative of the actual gear ratio of the transmission.

11 Claims, 1 Drawing Figure

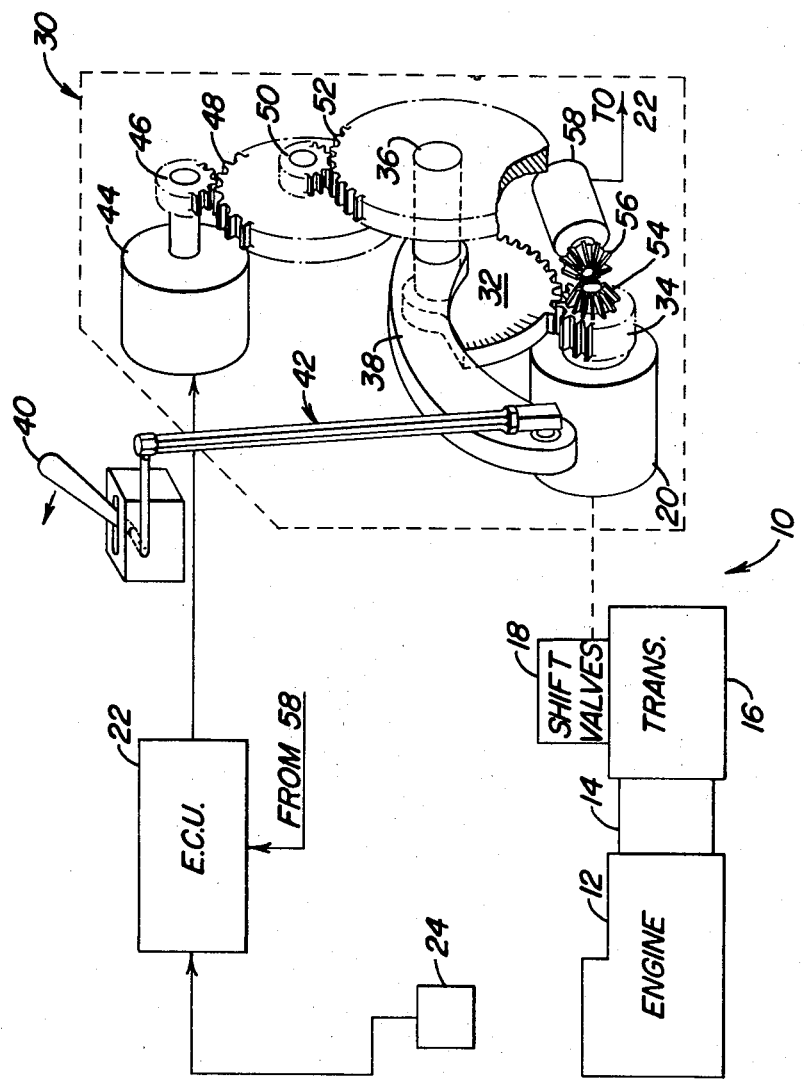

TRANSMISSION CONTROL INTERFACE MECHANISM

BACKGROUND OF THE INVENTION

The present invention relates to an interface mechanism for interfacing mechanical and electrical transmission control signals with a multi-speed transmission control system.

In many automatic and/or electronic transmission control systems, the mechanical operator-generated gear shift lever control signal is converted to an electrical signal and then transmitted by an electronic control unit to solenoid-operated shift control valves. With this type of system, a failure of the electronic control unit may interfere with both the automatic and manual control of the transmission. Accordingly, it would be desirable to provide a transmission control system with an interface mechanism which permits manual and automatic control of the transmission, wherein the manual control function is not subject to electrical failures.

SUMMARY OF THE INVENTION

An object of the present invention is to provide an interface mechanism for a vehicle transmission system which permits parallel automatic and manual control of the transmission.

These and other objects are achieved by the present invention which includes a sector gear operatively coupled to a manually controlled gear shift lever via a linkage, arm and shaft. The sector gear rotates an input gear of a rotary-type pilot valve which operates the shift valves of a hydraulically controlled transmission. A stepping motor rotates the sector gear via a torque-multiplying gear assembly in response to control signals generated by an electronic control unit. A gear encoder is coupled to the rotary valve via a pair of meshing bevel gears and generates signals representing the actual gear ratio of the transmission.

BRIEF DESCRIPTION OF THE DRAWINGS

The sole FIGURE is a partially schematic and partially perspective view showing an automatically and manually controlled transmission system incorporating the applicants' interface mechanism.

DETAILED DESCRIPTION

A transmission control system 10 includes an engine 12, such as a diesel tractor engine, a conventional manually-operated clutch 14, and a known multi-speed transmission 16, such as, for example, the 15-speed transmission described in U.S. patent application Ser. No. 134,274, filed Mar. 26, 1980 and assigned to the assignee of the present invention, or the multi-speed transmissions described in U.S. Pat. No. 4,004,473. The transmission 16 is shifted by a shift valve assembly 18 which is controlled by a rotary-type pilot valve 20, although a linear-type pilot valve would function as well. The pilot valve 20 will have discrete positions for each of the multiple speeds of the transmission 16. An electronic control unit 22 receives signals representing one or more vehicle-operating parameters, from one or more sensors, such as sensor 24. As an example, sensor 24 could be an engine speed sensor, such as described in U.S. Pat. No. 4,208,925. The control unit 22 also receives a gear ratio signal, GR, representing the actual gear ratio of the transmission 16 from the applicants' interface mechanism 30. The control unit 22 generates transmission control signals, TC, as a function of the input signals to the control unit 22. The control unit 22, as well as the rotary valve 20 and the shift valves 18, form no part of the present invention, but are included in this description merely for the purpose of exemplifying the environment in which the applicants' interface mechanism can be used. The aforementioned U.S. Pat. No. 4,208,925 describes an electronic control unit and a transmission control system which could be adapted to operate along with the applicants' interface mechanism 30 by converting the "up" and "down" signals therein to signals which would cause clockwise or counterclockwise rotation of the stepping motor 44, depending upon whether the transmission is to be shifted to a higher or lower gear.

The applicants' interface mechanism 30 includes a sector gear 32 which meshingly engages an input gear 34 of the pilot valve 20. The sector gear 32 is non-rotatably mounted on a shaft 36. An arm 38 has one end non-rotatably connected to the shaft 36 and another end operatively coupled to a manually movable gear shift lever 40 via a linkage 42.

A commercially available stepping motor 44, such as Model No. 072-0060-RA from Warner Brake and Clutch, or equivalent, rotates an output gear 46 in response to the TC control signals received from the control unit 22. Output gear 46 is coupled to shaft 36 via speed-reducing and torque-multiplying gears 48, 50 and 52.

A bevel gear 54, which may be integral with the rotary input gear 34 of rotary valve 20, meshes with a corresponding bevel gear 56 which is connected to an input shaft of a rotary gear encoder 58. The gear encoder 58 may be a rotary potentiometer or preferably, it could be a plurality of cam-actuated switches arranged to be opened and closed so as to give an indication of the angular position of the rotary valve 20 and, thus, of the actual gear ratio of the transmission. The gear ratio signal, GR, generated by the gear encoder 58, is received by the control unit 22 and may be communicated to a gear number display device (not shown), such as a digital display device located in the operator's compartment.

Note that with the applicants' interface mechanism, the stepping motor 44 and the gear shift lever 40 are both mechanically and positively coupled to the rotary valve input gear 34 in a parallel manner. Thus, even if the control signal, TC, would direct the stepping motor 44 to upshift the transmission 16, the operator can manually override this instruction by manual operation of the gear shift lever 40. Similarly, the transmission 16 can be manually shifted by moving the gear shift lever 40 when the automatic control unit 22 or the stepping motor 44 are inoperative. During manual control, the stepping motor 44 freely rotates when the shift lever is moved, thus no clutch is required to disengage the stepping motor 44 during manual operation. Note, also, that when the transmission is automatically shifted by a rotation of the stepping motor 44, this shifting is reflected by a corresponding change in the position of the gear shift lever 40.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. In a vehicle having a single manually movable gear shift lever and a hydraulically controlled transmission operated via a control valve assembly, a control interface mechanism comprising:
   first mechanical means directly coupling the gear shift lever to the control valve assembly for actuating the control valve assembly to operate the transmission in response to movement of the gear shift lever;
   motor means for moving in response to electrical control signals applied to an input thereof; and
   second mechanical means coupled between the motor means and the control valve assembly to operate the transmission in response to movement of the motor means, the first and second mechanical means moving the gear shift lever in response to movement of the motor means.

2. The invention defined in claim 1, wherein the control valve assembly comprises:
   a plurality of pilot-operated shift valves operable to shift the transmission among its gear ratios; and
   a rotary pilot valve rotatable to operate the shift valves.

3. The invention of claim 1, further comprising:
   a gear ratio encoder coupled to one of the mechanical means and movable in response to motion thereof to generate signals indicative of an actual gear ratio of the transmission.

4. The invention of claim 1, wherein the first mechanical means comprises:
   a shaft, a first gear wheel mounted for rotation with the shaft and adapted for engaging an input gear wheel of the control valve assembly, an arm having one end fixed to the shaft and another end mechanically linked to the gear shift lever.

5. The invention of claim 1, wherein the second mechanical means comprises:
   a rotatable shaft;
   a first gear wheel mounted for rotation with the shaft and adapted for engaging an input gear wheel of the control valve assembly, a second gear wheel mounted for rotation with the shaft, an output gear wheel rotatable by the motor means and torque-multiplying means coupled between the output gear wheel and the second gear wheel for rotating the second gear wheel in response to movement of the motor means.

6. The invention of claim 1, wherein the first and second mechanical means comprises:
   a rotatable shaft;
   a first gear wheel mounted for rotation with the shaft and adapted for engaging an input gear wheel of the control valve assembly;
   an arm having one end fixed to the shaft and another end mechanically linked to the gear shift lever;
   a second gear wheel mounted for rotation with the shaft;
   an output gear wheel rotatable by the motor means; and
   torque-multiplying means coupled between the output gear wheel and the second gear wheel for rotating the second gear wheel in response to rotation of the output gear wheel.

7. In a vehicle having a single manually movable gear shift lever and a hydraulically controlled transmission operated via a movable pilot valve and pilot-operated transmission shift valves, a control interface mechanism comprising:
   a first mechanical coupling directly coupling the shift lever to the pilot valve for moving the pilot valve in response to movement of the shift lever, said first coupling being the only coupling between the gear shift lever and the pilot valve;
   motor means movable in response to electrical control signals applied to an input thereof; and
   a second mechanical coupling directly coupling the motor means to the pilot valve for moving the pilot valve in response to movement of the motor means.

8. The invention of claim 7, wherein the first mechanical coupling comprises:
   a first gear adapted for engaging an input gear of the pilot valve, a shaft non-rotatably connected to the first gear, an arm having one end non-rotatably connected to the shaft and another end coupled to the shift lever via a linkage.

9. The invention of claim 7, wherein the second mechanical coupling comprises:
   a first gear adapted for engaging an input gear of the pilot valve, a shaft non-rotatably connected to the first gear, a second gear non-rotatably mounted on the shaft, an output gear rotatable by the motor means and torque-multiplying gear means coupled between the output gear and the second gear for rotating the second gear in response to movement of the motor means.

10. In a vehicle having a single manually operated gear shift lever, a hydraulic controlled transmission operated via a rotary pilot valve and pilot-operated transmission shift valves, a control interface mechanism comprising:
    a first gear operatively engaging the pilot valve;
    a shaft non-rotatably connected to the first gear;
    an arm having one end non-rotatably connected to the shaft and another end operatively coupled to the gear shift lever for rotating the shaft and first gear in response to movement of the gear shift lever, the first gear, the shaft and the arm comprising a mechanical connection between the gear shift lever and the pilot valve, said mechanical connection being the only connection between the gear shift lever and the pilot valve;
    electrically operated motor means for rotating in response to electrical control signals applied to an input thereof; and
    torque-multiplying gear means for coupling the motor means to the shaft and for rotating the shaft and the first gear in response to rotation of the motor means.

11. The invention of claim 10, further comprising:
    a first bevel gear rotatable with the pilot valve;
    rotary gear encoder means for generating a signal indicative of an actual gear ratio of the transmission; and
    a second bevel gear meshing with the first bevel gear and connected to the gear encoder means to rotate the gear encoder in response to rotation of the pilot valve.

* * * * *